(12) United States Patent
Baccas et al.

(10) Patent No.: US 8,782,786 B2
(45) Date of Patent: Jul. 15, 2014

(54) REMEDIAL ACTION AGAINST MALICIOUS CODE AT A CLIENT FACILITY

(75) Inventors: Paul Baccas, Oxford (GB); Fraser Howard, Finstock (GB); Vanja Svajcer, Oxford (GB)

(73) Assignee: Sophos Limited, Abingdon Oxfordshire (GB)

( * ) Notice: Subject to any disclaimer, the term of this patent is extended or adjusted under 35 U.S.C. 154(b) by 1261 days.

(21) Appl. No.: 11/694,109

(22) Filed: Mar. 30, 2007

(65) Prior Publication Data
US 2008/0244074 A1 Oct. 2, 2008

(51) Int. Cl.
*G06F 11/00* (2006.01)

(52) U.S. Cl.
USPC ...... 726/23; 726/1; 726/2; 709/223; 709/224; 709/227

(58) Field of Classification Search
USPC .......... 713/1, 2, 188, 194; 380/200, 201, 255, 380/277; 726/2, 1, 22, 23; 709/223, 224, 709/227
See application file for complete search history.

(56) References Cited

U.S. PATENT DOCUMENTS

| | | | | |
|---|---|---|---|---|
| 5,960,170 | A * | 9/1999 | Chen et al. | 714/38 |
| 6,205,551 | B1 * | 3/2001 | Grosse | 726/25 |
| 6,751,668 | B1 * | 6/2004 | Lin et al. | 709/227 |
| 6,763,462 | B1 * | 7/2004 | Marsh | 713/188 |
| 6,920,493 | B1 * | 7/2005 | Schwab | 709/223 |
| 7,099,320 | B1 * | 8/2006 | Salerno | 370/389 |
| 7,234,168 | B2 * | 6/2007 | Gupta et al. | 726/25 |
| 7,301,899 | B2 * | 11/2007 | Goldstone | 370/230 |
| 7,325,185 | B1 * | 1/2008 | Szor | 714/799 |
| 7,330,838 | B2 * | 2/2008 | Rogers et al. | 705/64 |
| 7,613,172 | B2 * | 11/2009 | Gilchrist et al. | 370/352 |
| 7,624,444 | B2 * | 11/2009 | Gupta et al. | 726/23 |
| 7,707,305 | B2 * | 4/2010 | Afek et al. | 709/238 |
| 2002/0194489 | A1 * | 12/2002 | Almogy et al. | 713/200 |
| 2004/0111632 | A1 * | 6/2004 | Halperin | 713/200 |
| 2006/0212925 | A1 * | 9/2006 | Shull et al. | 726/1 |
| 2006/0236401 | A1 * | 10/2006 | Fosdick | 726/25 |
| 2007/0094343 | A1 * | 4/2007 | Sangle et al. | 709/207 |
| 2007/0156592 | A1 * | 7/2007 | Henderson | 705/51 |
| 2007/0169170 | A1 * | 7/2007 | Shiran | 726/2 |
| 2008/0082662 | A1 * | 4/2008 | Dandliker et al. | 709/225 |
| 2008/0114709 | A1 * | 5/2008 | Dixon et al. | 706/13 |

* cited by examiner

*Primary Examiner* — Saleh Najjar
*Assistant Examiner* — Peiliang Pan
(74) *Attorney, Agent, or Firm* — Strategic Patents, P.C.

(57) ABSTRACT

Aspects of this invention may relate to a malicious application remedial action request application where a network site interaction may be requested from a client computing facility; the network site interaction from the client computing facility may be determined to be unacceptable based on an acceptance policy at a gateway facility; access to the network site from the client computing facility may be denied; information relating to the attempted interaction with the network site may be sent from the gateway facility to the client computing facility, wherein the information may indicate that the attempted interaction occurred; and the client computing facility may interpret the information relating to the attempted interaction, determine whether the attempted interaction was the result of an automatically generated request, and take remedial action in the event that the attempted interaction was the result of the automatically generated request.

18 Claims, 4 Drawing Sheets

US 8,782,786 B2

REMEDIAL ACTION AGAINST MALICIOUS CODE AT A CLIENT FACILITY

BACKGROUND

1. Field

This invention relates to blocking and removing malicious software threats from client computers, and more particularly, using the client computer to aid in the clearing of the client computer of malicious code by sending an information file from a facility blocking the network access to the client instructing the client computer to perform remedial actions to identify the malicious application.

2. Background

Many active malware applications use numerous websites to host components of the malicious code and applications. They may frequently use sophisticated techniques to avoid detection. Such techniques may typically involve multiple components that are downloaded to the victim client, once some rogue code or application is running. The delivery and execution of each component may be required to fully deliver the payload of the particular application. Blocking a request at a gateway to break the infection mechanism has become a critical part of security. Current gateway solutions may deny access to certain website requests; however, stopping the requests may require user or administrator interaction. Malware operating on a client may be sophisticated enough to make alternate requests if the first request is unsuccessful. For example, malware running on a client may try to download files from five separate websites. If three requests are blocked by conventional technologies at the gateway, two may succeed and the client may be further infected/compromised.

A need exists for improved methods and systems that provide identification and prevention of malware operations.

SUMMARY

A method and system disclosed herein may include requesting a network site interaction from a client computing facility; determining that the network site interaction from the client computing facility is unacceptable based on an acceptance policy at a gateway facility; denying access to the network site from the client computing facility; sending information relating to the attempted interaction with the network site from the gateway facility to the client computing facility, wherein the information may indicate that the attempted interaction occurred; and causing the client computing facility to interpret the information relating to the attempted interaction, determine whether the attempted interaction may be the result of an automatically generated request, and take remedial action in the event that the attempted interaction may be the result of the automatically generated request.

The automatically generated request may be sent by a malicious code, a worm, a Trojan horse, a spoofing application, a spamming application, a macro virus, a logic-bomb virus, a spyware application, a software application, a file, or the like.

The acceptance policy may include an unacceptable network site database. The acceptance policy may include an acceptable network site database. The acceptance policy may include a network site reputation database. The acceptance policy may include a rule evaluation of the network site interaction acceptability. The rule evaluation may be a regular expression rule, a virus description language (VDL) file, a text file, a policy, or the like. The acceptance policy may be based on a black list, a block list, a white list, an acceptance list, or the like.

The network site interaction may be an access request to a network system, a website interaction, a URL interaction, an FTP interaction, a peer-to-peer network interaction, associated with the network of the client computing facility, associated with a network other than the client computing facility network, or the like.

The information may be stored on the client computing facility. The stored information may be parsed by a client computer facility malicious code analysis application using a virus identity file (IDE). The IDE parsed information may be used to determine an appropriate action by the client computer facility.

The remedial action taken by the client computer facility may be a result of a client computing facility resident malicious code detection application accessing information using IDE information. A new IDE file may be requested by the client computer facility as a result of the denied network access interaction. A new IDE file may be sent to the client computer facility from the gateway as a result of the denied network access interaction. The existing IDE file may be used by the client computer facility as a result of the denied network access interaction.

The information may include data adapted to be interpreted by the client computing facility. Data adapted to be interpreted may include address information on the requested network site, an application requesting the requested network site interaction, a file requesting the requested network site interaction, a rule that blocked the requested network site interaction.

The information may include at least one command to be executed by the client computing facility. The command may be to scan the client computing facility. The command may be to scan a software application. The command may be to scan a file. The command may be to isolate the client computing facility. The client computing facility may be isolated from additional network interaction requests, isolated to a restricted access portion of the network, isolated from interaction with other client computing facilities, or the like. The command may be to stop execution of an application requesting the network site interaction. The command may be to terminate a process requesting the network site interaction. The command may be to terminate a service requesting the network site interaction. The command may be to quarantine a file requesting the network site interaction. The command may be to remove a file requesting the network site interaction. The command may be to report the malware activity. The step of causing the client computing facility to interpret the information may further include causing the client computing facility to execute the at least one command.

The client computing facility may be part of a computer network facility. The computer network facility may be at least one of a LAN, a WAN, a peer-to-peer network, an intranet, an Internet, or the like.

The remedial action may include scanning the client computing facility for malware. The remedial action may include scanning a software application. The remedial action may include scanning a file. The remedial action may include isolating the client computing facility. The client computing facility may be isolated from additional network interaction requests, isolated to a restricted access portion of the network, isolated from interaction with other client computing facilities, or the like. The remedial action may include stopping execution of an application requesting the network site interaction. The remedial action may include terminating a process requesting the network site interaction. The remedial action may include terminating a service requesting the network site interaction. The remedial action may include quarantining a file requesting the network site interaction. The remedial action may include removing a file requesting the network site interaction. The remedial action may include reporting the malware activity. The remedial action may include any action determined by the client computer facility malicious code analysis application interacting with the IDE and the information.

The method and system may further include the step of sending an access approval request from the client computing facility to the gateway facility indicating that the requested network site interaction may be user initiated and may request a policy change to allow the user initiated network site interaction. The method and system may further include the step of allowing at least temporary network site interaction from the client computing facility through the gateway facility based in the requested policy change.

A method and system disclosed herein may include requesting a network site interaction from a client computing facility; determining that the network site interaction from the client computing facility may be unacceptable based on an acceptance policy facility located on the client computing facility; denying access to the network site from the client computing facility; and causing the client computing facility to interpret information of the attempted interaction as determined by the acceptance policy facility, determine whether the attempted interaction may be the result of an automatically generated request, and take remedial action in the event that the attempted interaction may be the result of the automatically generated request.

The acceptance policy facility may be a software application on the client computer facility, a firmware application on the client computer facility, a hardware application on the client computer facility, or the like. The acceptance policy facility may include an unacceptable network site database, an acceptable network site database, a network site reputation database, a rule evaluation of the network site interaction acceptability, or the like. The rule evaluation may be a regular expression rule, a virus description language (VDL) file, a text file, a policy, or the like. The acceptance policy facility may be based on a black list, a block list, a white list, an acceptance list, or the like.

The automatically generated request may be sent by a malicious code. The malicious code may be a worm, a Trojan horse, a spoofing application, a spamming application, a macro virus, a logic-bomb virus, a spyware application, a software application, a file, or the like.

The network site interaction may be an access request to a network system, a website interaction, a URL interaction, an FTP interaction, a peer-to-peer network interaction, associated with the network of the client computing facility, associated with a network other than the client computing facility network, or the like.

The information may be stored on the client computing facility. The information may be stored in client computer facility random access memory. The information may be stored on a client computer facility storage medium.

The remedial action taken by the client computer facility may be a result of a client computer facility resident malicious code detection application accessing information using IDE information. A new IDE file may be requested by the client computer facility as a result of the denied network access interaction. A new IDE file may be sent to the client computer facility from the gateway as a result of the denied network access interaction. The existing IDE file may be used by the client computer facility as a result of the denied network access interaction.

The information may include data adapted to be interpreted by the client computing facility. Data adapted to be interpreted may include address information on the requested network site, an application requesting the requested network site interaction, a file requesting the requested network site interaction, a rule that blocked the requested network site interaction, or the like.

The information may include at least one command to be executed by the client computing facility. The command may be to scan the client computing facility. The command may be to scan a software application. The command may be to scan a file. The command may be to isolate the client computing facility. The client computing facility may be isolated from additional network interaction requests, isolated to a restricted access portion of the network, isolated from interaction with other client computing facilities, or the like. The command may be to stop execution of an application requesting the network site interaction. The command may be to terminate a file requesting the network site interaction. The command may be to quarantine a file requesting the network site interaction. The command may be to remove a file requesting the network site interaction. The command may be to report the malware activity.

The step of causing the client computing facility to interpret the information further may include causing the client computing facility to execute the at least one command.

The client computing facility may be part of a computer network facility. The computer network facility may be at least one of a LAN, a WAN, a peer-to-peer network, an intranet, and an Internet.

The remedial action may include scanning the client computing facility for malware. The remedial action may include scanning a software application. The remedial action may include scanning a file. The remedial action may include isolating the client computing facility. The client computing facility may be isolated from additional network interaction requests, isolated to a restricted access portion of the network, isolated from interaction with other client computing facilities, or the like. The remedial action may include stopping execution of an application requesting the network site interaction. The remedial action may include terminating a file requesting the network site interaction. The remedial action may include quarantining a file requesting the network site interaction. The remedial action may include removing a file requesting the network site interaction. The remedial action may include reporting the malware activity. The remedial action may include any action determined by the client computer facility malicious code analysis application interacting with the IDE and the information.

The method and system may further include the step of sending an access approval request from the client computing facility to the acceptance policy facility indicating that the requested network site interaction may be a user initiated and requesting a policy change to allow the user initiated network site interaction. The method and system may further include the step of allowing at least temporary network site interaction from the client computing facility through the acceptance policy facility based in the requested policy change.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF FIGURES

The systems and methods described herein may be understood by reference to the following figures.

DETAILED DESCRIPTION OF FIGURES

As a normal part of network activities, client computing facilities may attempt to access network locations internal and external to the client computing facility network. Access controlling facilities, such as gateways, may be responsible for determining if the client computing facilities should be allowed access to the requested network. In embodiments, the requested network access may be a user attempting to access other computer facilities for legitimate reasons, but the requested network access may also be a malicious application on the client computing facility attempting to gain access to the computer devices. In an embodiment, the malicious code may be a worm, a Trojan horse, a spoofing application, a spamming application, a macro virus, a logic-bomb virus, a spyware application, a software application, a potentially unwanted application (PUA), a file, or other code or application that may be intent on malicious behavior within a computer or network facility. Using a network request access protocol, the access controlling facility may be able to determine if the network access request is to be allowed. If the access is denied, the network access request may be returned to the client computing facility to determine the source of the network access request, use the scanning capability of the client computing facility to determine the source of the denied network access request, and take action against the source if the source is determined to be malicious.

Figure 1:
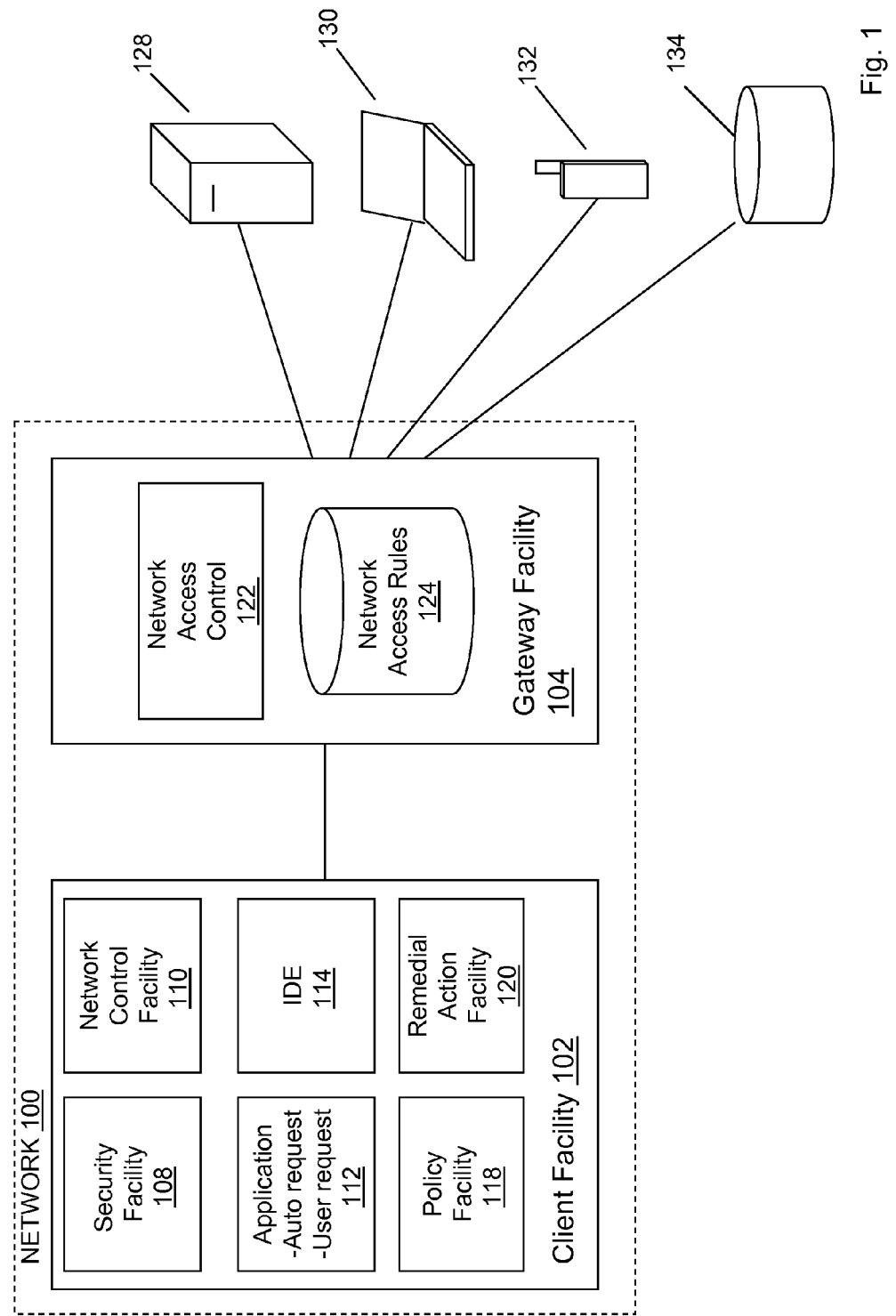
FIG. 1 shows an embodiment of a remedial action architecture for a client facility, a gateway facility, and external computer devices.

Referring to FIG. 1, a remedial action request architecture that may include a client computing facility 102 and a gateway facility 104 is shown. In an embodiment, a client computing facility 102 may be any type of computing device that may reside on a network 100 and may include the capability of requesting access to other internal or external client computing facilities. The client computing facility 102 may be any type of computing device that may include a desktop computer, a laptop computer, a tablet computer, a handheld computer, a smart phone computing device, or the like. The client computing facility 102 resident network 100 may be any type of network 100 that may include a LAN, WAN, Peer-to-Peer network, intranet, internet, or the like and the network access requests may be to other client computing facilities 102 within the network 100 or to an external network; the external network may include a LAN, WAN, Peer-to-Peer network, intranet, internet, or the like. The network 100 may be a wired network, wireless network, a combination of wired and wireless network, or the like. In an embodiment, the network access request may be to a URL, an FTP access, a peer-to-peer access request, a request within the network 100, a request to another network 100, or the like.

A gateway facility 104, may be any network computing device that may control access of client computing facilities from one network to another network or within a network. Access control of the network 100 may include controlling network 100 access request from client computing facilities 102 from within the network 100 to computing facilities external to the network 100, controlling access request from external computing facilities external to the network 100 to client computing facilities, or the like. The gateway may include at least one protocol to determine if the network 100 access request is to be allowed such as using a block list, a black list, an allow list, a white list, a rules data base, a policy database, or the like. Based on the protocol, the gateway facility 104 may allow or block a network access request from an internal client computing facility 102, an external computing facility, or the like. When a request is blocked by the gateway facility 104, information regarding the block may be transmitted to a client facility 102. In an embodiment, the information may be a data file, a command file, a combination of a data file and command file, or the like. The data file may contain a number of commands, definitions, or instructions to be parsed and acted upon, or the like. In an embodiment the data file may include address information on the requested network site, an application requesting the requested network site interaction, a file requesting the requested network site interaction, a rule that blocked the requested network site interaction, or the like.

A security facility 108 may be a software application that may provide malicious code and malicious application protection to the client computing facility 102. The security facility may have the ability to scan the client computing facility 102 files for malicious code, remove or quarantine certain applications and files, prevent certain actions, perform remedial actions (e.g. as described herein) and perform other security measures. In embodiments, scanning the client computing facility 102 may include scanning some or all of the files stored to the client computing facility 102 on a periodic basis, may scan applications once the application has been requested to execute, may scan files as the files are transmitted to or from the client computing facility 102, or the like. The scanning of the applications and files may be to detect known malicious code or known malicious applications. In an embodiment, new malicious code and malicious applications may be continually developed and distributed and updates to the known malicious code file may be provided on a periodic basis, on a demand basis, on an alert basis, or the like.

A network control facility 110 may provide the network access capability to the client computing facility 102; the network access may be to other client computing facilities 102 within the network 100, the network access may be to other computer facilities external to the client computing facility 102 network 100, or the like. The network control facility 110 may be a software application (e.g. a web browser), hardware (e.g. a network access device), a firmware application, a combination of software, hardware, and firmware, or the like. In an embodiment, the network control facility 110 may interface with the security facility 108, any associated malicious code files, and a policy facility 118 to determine network 100 access rights and permissions. Additionally, once the client computing facility 102 network control facility 110 determines and provides network 100 access, the gateway facility 104 may make a determination of what connectivity may be made to other client computing facilities and networks.

In an embodiment, an application 112 may be any software file that may be executed on the client computing facility 102. The application 112 may be an application 112 that is executed at a user request to perform some work on the client computing facility 102, an application 112 that requests network access to another computing facility either within the same network 100 as the client computing facility 102 or external to the client computing facility 102, or the like. In embodiments, the application access request may be user requested, may be auto-requested, or the like. Depending on policies for network access requests, a user network access request may be allowed or denied. If an access request is denied, the user may or may not be notified, the access request denial may just fail to connect to the desired network location. In embodiments, the auto-requested network request may be a result of a legitimate application 112 requesting information from another client computing facility 102 or network, a malicious application requesting network access, or the like. The malicious application network access may be an attempt to corrupt the client computer facility 102, an attempt to corrupt the gateway facility 104, an attempt to corrupt the network 100 on which the client computing facility 102 resides, an attempt to access external networks or computer facilities, or the like.

An IDE 114 may be a virus identity file that may include definitions of known or potential malicious code. The IDE 114 may provide information that may identify malicious code within files, applications, or the like. The IDE 114 may be accessed by the security facility 108 when scanning files or applications 112 within the client computing facility 102 for the determination of malicious code that may be within the file or application 112. In an embodiment, when the information regarding a blocked access is received from the gateway facility 104, the security facility 108 may access the IDE 114 to parse the data file and determine an action to be taken on an application requesting access to a denied network location. The IDE 114 may contain a number of commands, definitions, or instructions, to be parsed and acted upon, or the like. In embodiments, the client computing facility 102 may be updated with new IDE 114 files periodically to provide the client computing facility 102 with the most recent malicious code definitions; the updating may be performed on a set time period, may be updated on demand from the client computing facility 102, may be updated on demand from the network 100, may be updated on a received malicious code alert, or the like. In an embodiment, the client computing facility 102 may request an update to the IDE 114 files from an update facility within the network 100, may request updated IDE 114 files from a computing facility external to the network 100, updated IDE 114 files may be provided to the client computing facility 102 from within the network 100, IDE 114 files may be provided to the client computing facility 102 from an external computing facility from an external network, or the like.

In an embodiment, the policy facility 118 may be a set of rules or policies that may indicate network access permissions for a client computing facility 102. The policy facility 118 may include a database, a text file, a combination of databases and text files, or the like. In an embodiment, the policy database may be a block list, a black list, an allowed list, a white list, or the like that may provide a list of network locations that may or may not be accessed by the client computing facility 102. The policy facility 118 may include rules that may be interpreted with respect to the network access request to determine if the request should be allowed. The rules may provide a generic rule for the type of access that may be granted; the rules may be related to the policies of an enterprise for access rights for the enterprise's client computer facilities 102. For example, there may be a rule that does not permit access to sporting websites. When a website is requested by the client computing facility 102, the security facility 108 may access the rules within the policy facility 118 to determine if the requested access is related to a sporting website. In an embodiment, the security facility 108 may analyze the requested website to determine if the website matches with any of the policy facility 118 rules.

In an embodiment, a remedial action facility 120 may be an application that may respond to information from the gateway facility 104 when a client computing facility 102 network access request has been denied. In an embodiment, when the data file is received from the gateway facility 104, the remedial action facility 120 may parse the data file, interpret the various aspects of the data file, and act on the parsed data file information to determine actions to be taken on an application requesting access to a denied network location. In an embodiment, when the data file may be received from the gateway facility 104, the remedial action facility 120 may access the IDE to parse the data file and determine an action to be taken on an application requesting access to a denied network location. In an embodiment, the information received from the gateway facility 104 may be a command or a command file. The remedial action facility 120 may carry out any commands that are received or parsed from a data file from the gateway facility 120 without performing any interpretation of the commands. In an embodiment, the remedial action facility may interact with the received information and may perform various actions on an application requesting access to a denied network location. The action may be one or more of continuing to block all requests to a denied network location, a malicious code scan on the application, a malicious code scan on the client computer facility 102, quarantine of the application, terminating the application, isolation of the application, isolation of the client computer facility 102 to a location within the network that restricts network access, blocking a network access port from a client computer facility 102, reporting the application to a system administrator, or the like.

In an embodiment, a network access control 122 may be responsible for determining if a client computing facility 102 application should be granted access to a requested network location. The network location may be on the same network 100 as the gateway facility 104 or may be on another network. In an embodiment, the network access control 122 may verify access rights for client computing facilities from within the network 100 or may verify access rights of computer facilities from external networks. When network access for a client computing facility 102 is denied, the network access control 122 may send an information file to the client computing facility 102, the information file may contain data or commands that may provide instructions for the remedial action facility 120. The information sent by the network access control 122 may be a data file. The data file may contain a number of commands, definitions, instructions, commands to be parsed and acted upon by the remedial action facility, or the like. The information sent by the network access control 122 may be a command or command file that the remedial action facility may access and take action upon.

In an embodiment, the network access rules 124 may provide an information store to be accessed by the network access control 122. The network access rules 124 may include databases such as a block list, a black list, an allowed list, a white list, an unacceptable network site database, an acceptable network site database, a network site reputation database, or the like of network access locations that may or may not be accessed by the client computing facility 102. Additionally, the network access rules may incorporate rule evaluation, the rule evaluation may parse network access requests and apply the parsed information to network access rules. The network access rules may a generic set of rules that may be in support of an enterprise's network access policies such as denying access to certain types of websites, controlling instant messenger access, or the like. The rule evaluation may include regular expression rule evaluation, virus description language (VDL) evaluation, or other rule evaluation method for interpreting the network access request and comparing the interpretation to the established rules for network 100 access. In an embodiment, the network access rules 124 may receive a rules evaluation request from the network access control 122 and may return the rules evaluation to the network access control 122.

Figure 4:
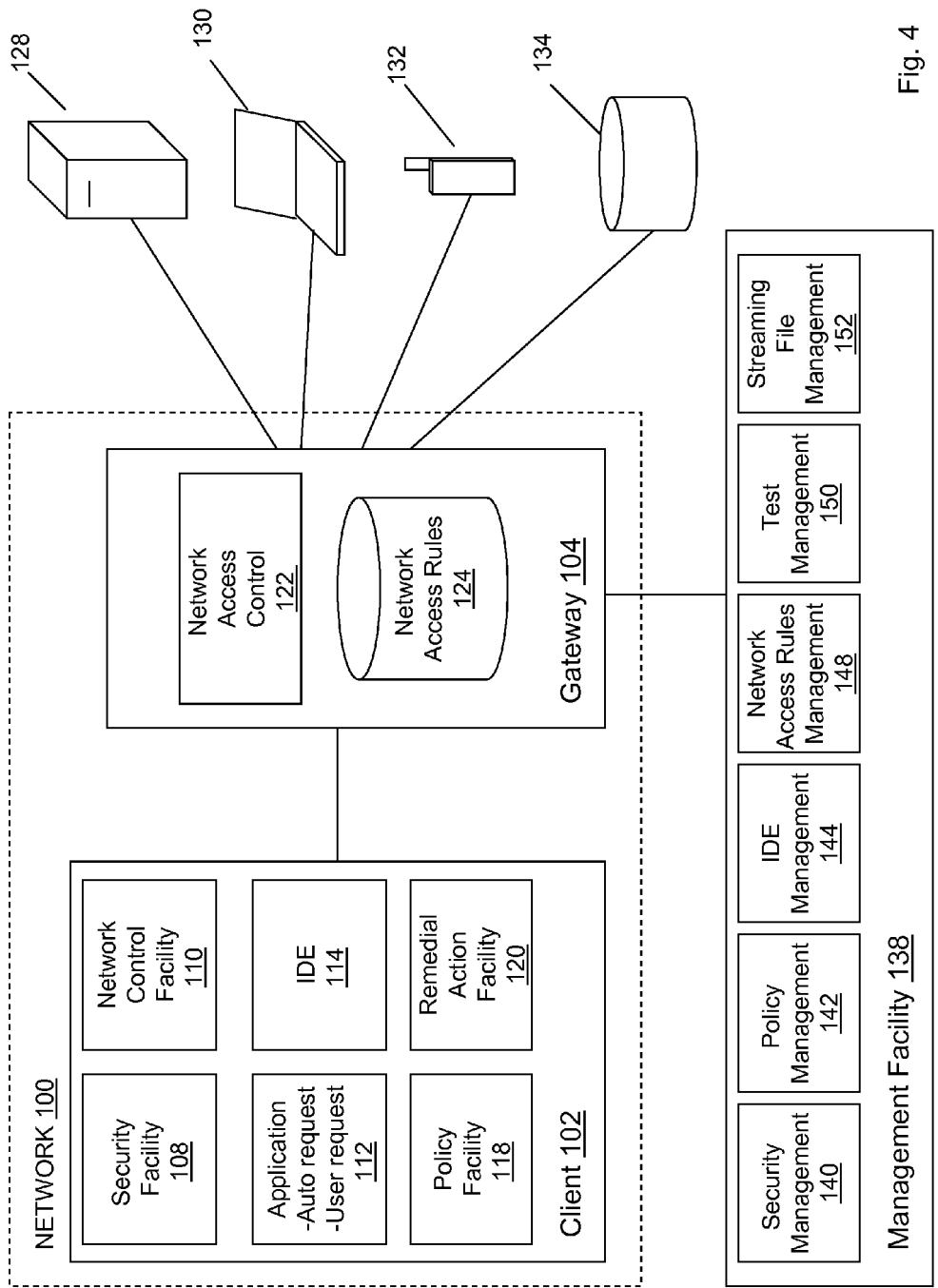
FIG. 4 shows an embodiment of the remedial action architecture shown in FIG. 1 as it may relate to other malicious code management architecture.

Referring to FIG. 4, a management facility 138 that may include a plurality of security management facilities is shown associated with the network 100 that may include a security management facility 140, a policy management facility 142, an IDE management facility 144, a network access rules management facility 148, test management facility 150, streaming file management 152, or the like.

In an embodiment, the security management facility 140 may provide for the overall security of the network 100 or set of networks and it may provide updated malicious code information to the network and associated client facilities. The updates may be a planned update, an update in reaction to a threat notice, an update in reaction to a request for an update, an update based on a search of known malicious code information, or the like. The system administrator may provide control over the security management when updates are performed. The updates may be automatically transmitted without a system administrator's direct control, may be manually transmitted by the system administrator, or the like. Security management 140 may include the management of receiving malicious code descriptions from a provider, distribution of malicious code descriptions to network 100 facilities, distribution of malicious code descriptions to client computing facilities 102, or the like. In an embodiment, the management of malicious code information may be provided to the network 100 and the network 100 may provide the malicious code information through the network 100 distribution system.

Policy management facility 142 may be similar to the security management 140 but with the distribution of enterprise wide access rules and policies that may maintain control of the access of client computing facilities 102 to network resources. The policies may be defined for application type, subset of application capabilities, organization hierarchy, computer facility type, user type, network location, or the like. Policies may be maintained by the system administrator and may be applied at the network 100 level. For example, a policy may restrict IM activity to only support personnel for communicating with customers. This may allow communication for departments requiring access, but may maintain the network 100 bandwidth for other activities by restricting the use of IM to only the personnel that need access to IM in support of the enterprise.

In an embodiment, IDE management facility 144 may provide for the timely updates of IDE information to the network 100, client computing facilities 102, and the like. New and altered malicious code and malicious applications may be continually created and distributed to networks worldwide. The IDE file that maintains the definitions of the malicious code and malicious application information for the protection of the networks 100 and client computing facilities 102 may need continual updating to provide continual defense of the network 100 and client computing facility 102 from the malicious code and malicious applications. The IDE management 144 may provide for automatic and manual methods of updating the IDE definitions. In embodiments, the network 100 may receive IDE files and distribute the IDE files to the network 100 client computing facilities 102, the client computing facilities 102 may receive the IDE file directly, the network 100 and client computing facilities 102 may both receive the IDE file, or the like. In an embodiment, the IDE files may be updated on a fixed periodic basis, on demand by the network 100 and/or the client computing facility 102, as a result of an alert of a new malicious code or malicious application, or the like. In an embodiment, the IDE files may be released as a supplemental file to an existing IDE file to provide for rapid updating of the IDE file.

Similar to IDE management facility 144, the network access rules management facility 148 may provide updated rules and policies to the gateway 104 network access rules 124. The network access rules 124 may be maintained by the network administrator using the network access rules management 148. In an embodiment, the network administrator may be able to maintain a set of access rules manually by adding rules, changing rules, deleting rules, or the like. Additionally, the system administrator may be able to retrieve predefined rule sets from a provider that may provide a set of rules to be applied to an entire enterprise. The network administrator may be able to modify the predefined rules as needed for a particular enterprise using the network access rules management 148.

In an embodiment, test management facility 150 may allow the system administrator, through a testing facility, to coordinate the testing of the security configurations of client computing facilities 102 on a network 104. The system administrator may be able to send test files to a set of client computing facilities 102 to test the ability of the client computing facility 102 to determine acceptability of the test file. After the test file has been transmitted, a recording facility may record the actions taken by the client computing facility 102 in reaction to the test file. The recording facility may aggregate the testing information from the client computing facility 102 and report the testing information to the system administrator. The system administrator may be able to determine the level of preparedness of the client computing facilities 102 by the reported information. Corrective action may be taken for any of the client computing facilities 102 as determined by the system administrator, the corrective action may be taken by the system administrator or by the user of the client computing facility 102.

In an embodiment, streaming file management 152 may provide the capability of checking streaming files received at the network 100, gateway facility 104, and client computing facility 102 for malicious code as the streaming files are received instead of storing the streaming file and then checking the stored streaming file for malicious code. This may provide the capability of not allowing a streaming file or portions of the streaming file containing malicious code from entering the client computing facility 102, gateway facility 104, or network 100. In an embodiment, the streaming file may be broken into blocks of information, and a plurality of virus identities may be used to check each of the blocks of information for malicious code. In an embodiment, any blocks that are not determined to be clear of malicious code may not be delivered to the client computing facility 102, gateway facility 104, or network 100.

Referring again to FIG. 1, protecting the client computing facility 102 from threats caused by malicious code and malicious applications may include more than one level. In an embodiment, malicious code may imbed itself into applications that may already be stored on the client computing facility 102, such as within a document application or document file. The threats may be received from other client computing facilities 102 on the same network as files are shared, received from external networks as the client computing facility 102 connects with other networks, or the like.

For protecting the individual client computing facility 102 the security facility may interact with the IDE file 114 and policy facility 118 as files are received at the client computing facility 102. The security facility 108 may attempt to determine if the incoming file may include malicious code or if the file is a malicious application by comparing the contents of the file with the IDE 114 file information. For malicious code and malicious applications that are previously defined within the IDE file this may provide adequate protection for the client computer facility 102 by cleaning the incoming file, denying the incoming file from being stored on the client computing facility 102, or the like.

In a similar manner, both the IDE file 114 and policy facility 118 may be used to scan an outgoing file and verify that the outgoing file is permitted to be transmitted per the enterprise rules and policies. By checking outgoing files, the security facility may be able discover malicious code infected files that were not detected as incoming files as a result of the client computing facility having been updated with either new IDE 114 files or policy facility 118 information. The IDE file 114 may discover the malicious code infected file by having received updates of developing malicious code from the system administrator, updates from an IDE provider, or the like. The policy facility 118 may discover the malicious code infected file by having received new updates from the system administrator, from a rules provider, or the like.

Once a client computing facility 102 has become infected with malicious code or a malicious application, the user of the client computing facility 102 may be unaware that the application is attempting to connect to another network location in an attempt to receive additional malicious code. Additionally, the malicious code or malicious application may have deactivated some or all of the security facility 108 leaving the client computing facility 102 with the inability to determine that a malicious file is attempting to access another network. Once infected, the user may not be aware that the client computing facility 102 application 112 is attempting to connect with another network.

Once a client computing facility 102 has become infected with malicious code, the malicious code may use the application 112 and network control facility 110 to attempt to connect to a network location where additional malicious code and/or malicious applications may be downloaded to the client computing facility 102. If the malicious code is not yet defined in the IDE file 114 or if at least part of the security facility 108 has been disabled, the malicious code may be successful in using the application 112 and network control facility 110 to request a network access from the gateway facility 104.

The client computing facility 102 network access request may be received at the gateway facility 104 network access control 122. The network access control 122 may act as a second level of defense against malicious code and malicious applications from accessing other network locations. The network access control 122 may be associated with the network access rules 124 that may provide all the rules for accessing other networks for the network 100. As previously described herein, the network access rules may include access databases, access rules that may be interpreted, a combination of databases and access rules, or the like.

In an embodiment, the network access request may be an attempt to connect to any type of computer facility on another network such as a server 128, desktop computer, laptop computer 130, smart device 132, database 134, or the like.

Once received at the network access control 122, the network access request may be analyzed, parsed, reviewed, or the like to determine if the network access request is allowed by the defined access rules stored within the network access rules 124. If the network access request is for a network location that is not allowed as defined by the rules within the network access rules 124, the network access request may be denied.

In a first embodiment, the denied network access request may be reported back to the client computing facility 102 as a denied access and the malicious code infected may continue attempts to access the same network location or a different access location with the possibility that the second network location may not be within the deny access rules. In an embodiment, the malicious code infected application 112 may try a plurality of different network locations in an attempt for a successful network access request.

In a second embodiment, with the denied network access request, the network access control 122 may return a file to the client computing facility 102 that may include information for investigating the source of the denied network access request. In an embodiment, the information file that is received at a client computing facility 102 may be accessed by the remedial action facility 120 to determine actions that the remedial action facility 120 and the security facility 108 may take to determine the source of the denied network access request. In embodiments, the sending of file information to the client computing facility 102 may comprise an attempt to find the source application of the denied network access request, the remedial action facility 120 may take action against the application 112 attempting the network accesses to prevent additional attempts to connect with network locations that are not permitted per the network access rules 124. In an embodiment, the information file may be stored on the client computing facility 102 and the storing of the information file may provide an indication for the remedial action facility 120 to analyze the information file.

In an embodiment, the information file may include commands determined by the network access control 122 to locate the source of the network access request. The remedial action facility 120 may parse the information file to at least one command. In an embodiment, the commands may be executed as the information file is parsed, the commands may be stored to a file from which the commands may be executed, or the like. In an embodiment, there may be more than one command, with a second command being executed based on the outcome of a first command. For example, the first command may include instructing the security facility 108 to scan all executing applications on the client computing facility 102 to determine the application 112 that requested the denied network access. The second command may include instructions to terminate executing applications 112 if the first command is not able to determine the application 112 that requested the denied network access. In an embodiment, one of the commands in the information file may be to request a new IDE file 114 that may provide the latest malicious code and malicious application information.

In an embodiment, the information file may include data that the remedial action facility 120 may interpret for locating the application that requested the denied network application request. In an embodiment, the data within the information file may include instructions to the remedial action facility 120 for steps to be taken to identify the application requesting the denied network access request. The remedial action facility 120 may parse the information file in to at least one instruction. In an embodiment, the parsed instructions may be interpreted by the remedial action facility 120 for the determination of the actions that are to be used to identify the application requesting the denied network access request. In embodiments, the instructions may be interpreted as requesting a new IDE file 114, requesting the security facility 108 to scan the client computing facility 102, terminating an identified application, isolating an identified application, reporting an identified application to a reporting facility within the network, requesting additional actions from the network access control 122, or the like.

Figure 2:
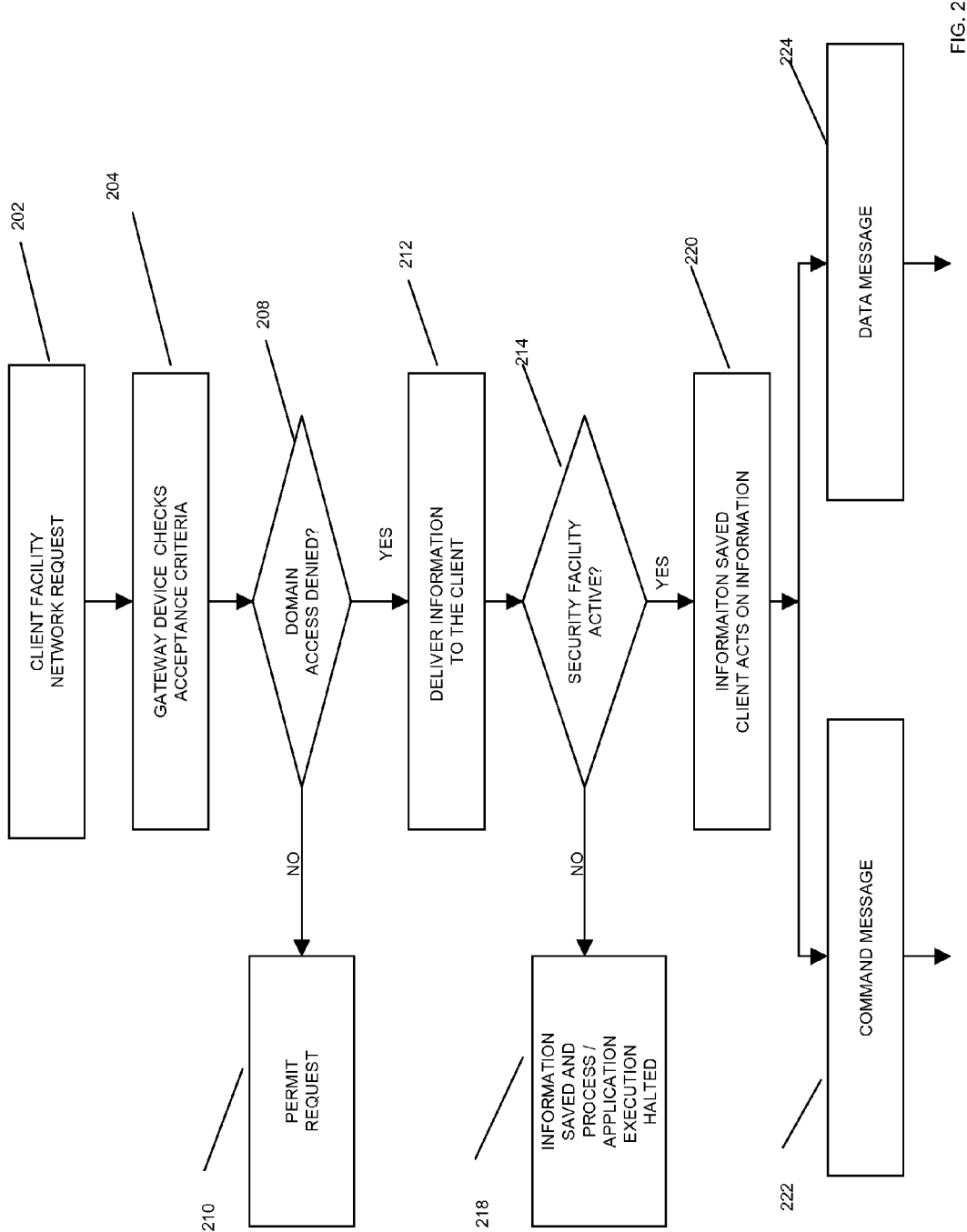
FIG. 2 shows a flow chart with an embodiment of a gateway facility determination if a network access request should be allowed or returned to a client facility for remedial action.
Figure 3:
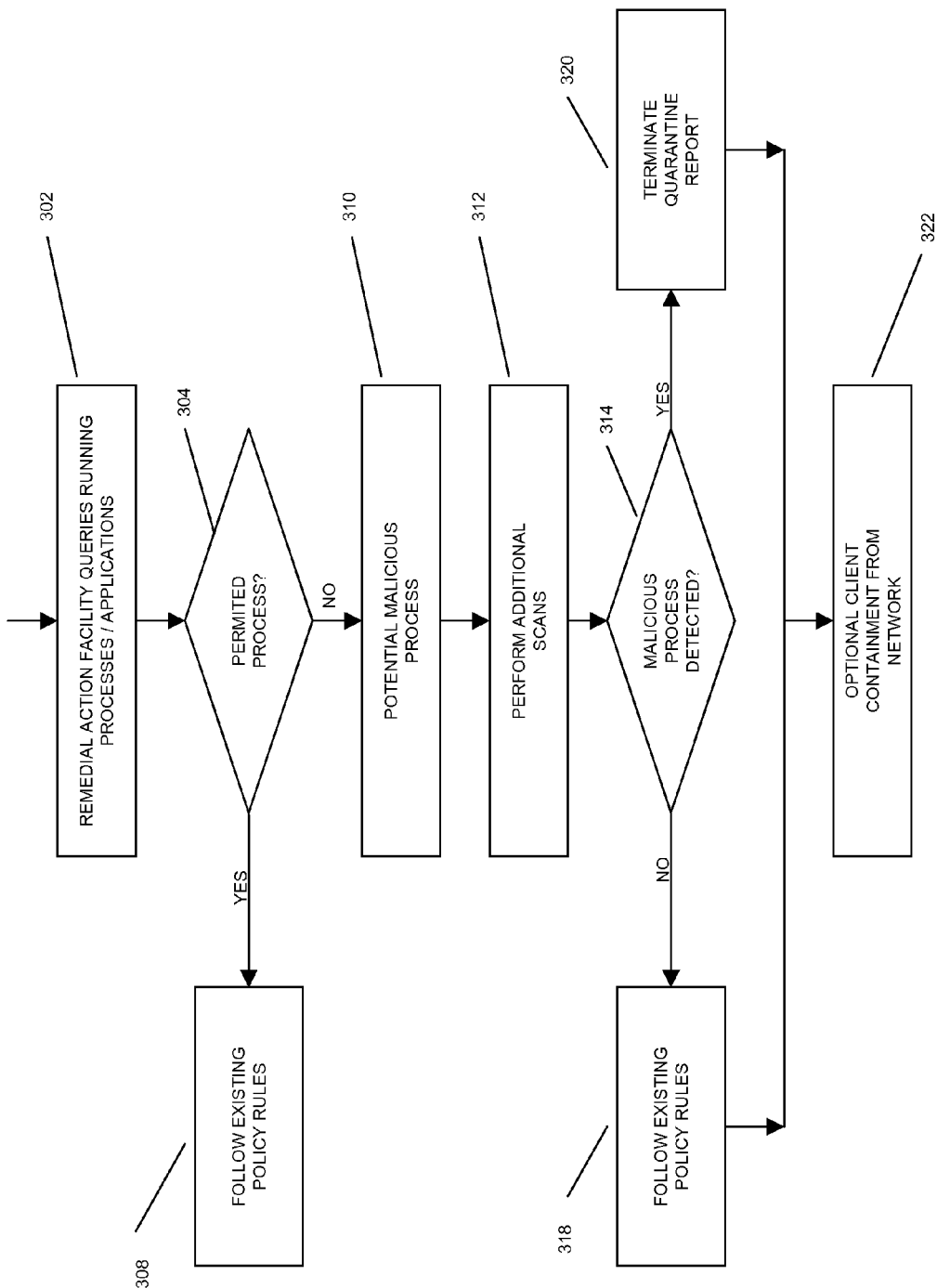
FIG. 3 shows a flow chart of possible actions by a client facility after a network access request has been denied and returned to the client facility for remedial action.

In FIG. 2 and FIG. 3, flow charts show an embodiment of the actions of the gateway facility 104 determining if an access request is permitted and the client computing facility 102 responding to the gateway sending an information file after the requested access is denied. Referring to FIG. 2, the process may begin with the client computing facility network request 202. In embodiments, the network request may be a result of a user request using an application 112, a network request from a malicious code infected application, a request from a malicious application, or the like.

At the gateway facility 104 the network access control 122 may communicate with the network access rules 124 for acceptance criteria 204 of the network access request. The network access control 122 may check blocked databases, allowed databases, enterprise access policies, enterprise access rules, or the like to determine if the network access request is permitted. At the network access control 122, it may be determined if access is denied 208. If the access is not denied, the network access request may be permitted 210 and the network access request process may be complete.

If the network access is denied 208, the network access control 122 may create and deliver the information file to the client computing facility 102 to provide information to the remedial action facility 120 for actions to be taken. With the receipt of the information file, the remedial action facility 120 may first determine if the security facility 108 is active 214. If the security facility 108 is not active, the remedial action facility 120 may not be capable of performing any of the commands for determining the application requesting the network access. In this case, the information may be saved to the client computing facility 102 and the application execution halted 218. In an embodiment, one of the commands within the information file may be to execute the security facility 108.

If the security facility 108 is active 214, the information file may be saved to the client computing facility 102 and the remedial action facility 120 may act on the information file 220. In an embodiment, the saving of the information file 220 may be the indication for the remedial action facility to act on the saved information file. In an embodiment, the information file may include commands 222 or data messages 224 for the remedial action facility 120 to parse and determine the actions that are to be performed by the security facility 108 and the client computing facility 102. As previously disclosed herein, the commands 222 within the information file may include at least one command that may be executed by the security facility 108, the client computing facility 102, or the like. The commands may not be interpreted, but may be executed in the form provided by the network access control 122. As previously disclosed herein, the data message may include at least one data element for the remedial action facility to interpret and request action from the security facility 108 and/or the client computing facility 102. In an embodiment, the data message 224 may include data for scanning the application 112, scanning the client computing facility 102, requesting a new IDE file 114 from the network 100, requesting a new IDE file 114 from an IDE provider, terminating the application 112, isolating the application 112 for additional scanning and review, isolating the client computing facility 102 to a restricted access section of the network 100, and the like. In an embodiment, the remedial action facility 120 may be capable of changing how one of the data elements are interpreted based on the outcome of the previous interpreted data element. For example, if a first data element was interpreted to request a new IDE file 114 and the new IDE file 114 is the same version as the current IDE file 114, the remedial action facility may interpret the next data element to terminate the executing application or applications. In an embodiment, if the remedial action facility 120 completes all of the data elements within the information file, the remedial action facility 120 may request further information files from the network access control 122, may terminate one or more applications, may isolate one or more applications, may isolate the client computing facility 102, or the like.

Referring now to FIG. 3, the remedial action facility 120, using the information file from the network access control 122, may query 302 all the running process and/or applications 112 to determine if the application is a permitted 304 process and/or application 112. If the process and/or application is a permitted 304 process, the process and/or application 112 may be allowed to continue executing following the existing 308 policy facility 118 rules. In an embodiment, the application may be permitted to continue execution, but the existing policy rules 308 may still prevent the application from accessing the requested network location. For example, the user may have requested a sports website that is not permitted under the policy rules. The application may be determined to be a permitted application 304, but the application will still not be permitted to access the sports website because it is not permitted by the enterprise policy.

If the process and/or application 112 is determined to not be permitted 304, the process and/or application 112 may be determined to be a potentially malicious 310 process and/or application 112. After the determination that the process/application 112 may be potentially malicious, the remedial action facility 120 may request the security facility 108 to perform additional scans 312 on the process and/or application 112. In an embodiment, the additional scans 312 may be performed after additional IDE files 114 have been downloaded to the client computing facility 102.

If during the additional scans 312 the security facility 108 makes a determination that process and/or application 112 is not malicious 314, the process and/or application 112 may be allowed to continue to execute following the existing policy rules 318. In an embodiment, as part of the information file from the network access control 122, a new set of policy rules may have been downloaded to the policy facility 118, therefore the policy rules may be different after the remedial action facility 120 completes all of the commands or data messages within the information file. The new policy rules may restrict the execution of the detected 314 process and/or application 112. In an embodiment, as part of, or in addition to, the new IDE files 114 and policy rules, the client computing facility 102 may be contained from the network 322 until the security facility 108 is able to complete a full scan and report the results of the full scan.

In an embodiment, if the process and/or application 112 is detected to be malicious 314 the process and/or application 112 may be terminated, quarantined, reported, or the like 320. In an embodiment, the process and/or application 112 may be terminated, quarantined, reported, or the like 320 until such time as the security facility 108 scans the client computing facility 102 and provides a report to the network 100 that the client computing facility 102 is free of known malicious applications. In an embodiment, if the security facility 108 is unable to clean or remove the malicious application, the client computing facility 102 may be contained from the network 322.

Referring to FIG. 4, an embodiment of the remedial action architecture of FIG. 1 is shown as it may relate to other malicious code management architecture. The management facilities 138 may interact with the network 100 to provide management of the security, policy, rules, IDE files, and testing of the network security. It may be understood that while the management facility 138 is shown outside of the network 100, may also be incorporated within the network 100. The management facility is also shown interacting with the gateway facility 104, but aspects of the management facility 138 may provide direct support of the client computing facility 102 such as the IDE management. Additionally, the individual management elements are shown acting as a combined facility, but it should be understood that the different management elements may act individually with the client computing facility 102 and the gateway facility 104.

The management elements of the management facility 138 may act in a preventative manner to provide up to date security information to the network 100 to prevent malicious applications from causing harm to the network. Malicious code and malicious applications can be developed and distributed rapidly and the management facility 138 may be reactive to a network threat issue. As discussed herein, when a network access request is denied, the network access control 122 may send the information file to the client computing facility 102 to provide instructions to determine the application 112 that has requested the denied network access. In this reactive state, the various management facilities 138 may be contacted by the remedial action facility 120 to request new policies, new rules, new IDE files, or the like to provide for the latest information to determine the malicious application. Additionally, after a malicious threat has been resolved on one of the client computing facilities 102 within the network, the testing management 150 may be requested by the network to perform test to determine the capability of other client computing facilities 102 within the network to detect the malicious threat. As a result of the testing management 150, the other client computing facilities 102 may have their security updated to provide the correct protection from the just detected threat.

While in many embodiments disclosed herein the client computing facility 102 and gateway facility 104, and/or operations thereof, are described as separate facilities, it should be understood that the gateway facility 104, and/or operations thereof, may be incorporated into the client computing facility 102. This may provide for a stand-alone client computing facility 102 that may include the gateway facility 104 functionality and may check network access request and return information back to a remedial action facility within the client computing facility 102. In an embodiment, the gateway facility 104 operations may be incorporated as a separate facility within the client computing facility 102 or may be incorporated as part of one of the existing elements within the client computing facility 102 such as the network control facility 110.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method, comprising:

requesting an interaction with a network site from a client computing facility;

determining that the interaction is unacceptable based on an acceptance policy for an enterprise at a gateway facility to the enterprise;

denying access to the network site from the client computing facility;

sending an information file to the client including information relating to the attempted interaction with the network site, wherein the information indicates that the interaction was requested; and causing the client computing facility, in response to receipt of the information file, to interpret the information relating to the requested interaction, determine whether the requested interaction was the result of an automatically generated request by malicious code, and take remedial action in the event that the attempted interaction was the result of the automatically generated request by malicious code.

2. The method of claim 1, wherein the acceptance policy comprises an unacceptable network site database.

3. The method of claim 1, wherein the acceptance policy comprises an acceptable network site database.

4. The method of claim 1, wherein the acceptance policy comprises a network site reputation database.

5. The method of claim 1, wherein the acceptance policy comprises a rule evaluation of the network site interaction acceptability.

6. The method of claim 1, wherein the acceptance policy is based on a block list.

7. The method of claim 1, wherein the acceptance policy is based on an acceptance list.

8. The method of claim 1, wherein the network site interaction is an access request to a network system.

9. The method of claim 1, wherein the information is stored on the client computing facility.

10. The method of claim 9, wherein the stored information is parsed by a client computer facility malicious code analysis application using a virus identity file (IDE).

11. The method of claim 10, wherein the IDE parsed information is used to determine an appropriate action by the client computer facility.

12. The method of claim 1, wherein the remedial action taken by the client computer facility is a result of a client computing facility resident malicious code detection application accessing information using IDE information.

13. The method of claim 1, wherein the information comprises data adapted to be interpreted by the client computing facility.

14. The method of claim 1, wherein the information comprises at least one command to be executed by the client computing facility.

15. The method of claim 1, wherein the remedial action comprises scanning the client computing facility for malware.

16. The method of claim 1, wherein the remedial action comprises any action determined by the client computer facility malicious code analysis application interacting with the IDE and the information.

17. The method of claim 1, further comprising the step of sending an access approval request from the client computing facility to the gateway facility indicating that the requested interaction was user initiated and requesting a policy change to allow the requested interaction.

18. A system, comprising:

a client computing facility associated with an enterprise;

a gateway adapted to provide network access to the client computing facility, the gateway further adapted to receive a network site interaction request from the client computing facility, the gateway implementing an acceptance policy for the enterprise that determines an acceptability of the network site interaction from the client computing facility, and the gateway configured to transmit an information file to the client computing facility when the gateway determines that the attempted interaction with the network site is unacceptable based on an acceptance policy for the enterprise; and a remedial action facility executing on the client computing facility responsive to the information file by determining whether the attempted interaction was the result of an automatically generated request from malicious code executing on the client, and taking remedial action in the event that the attempted interaction was the result of the automatically generated request.

* * * * *